(12) United States Patent
Liepold et al.

(10) Patent No.: US 6,584,366 B1
(45) Date of Patent: Jun. 24, 2003

(54) METHOD AND ARRANGEMENT FOR NEURAL MODELING OF A PAPER WINDING DEVICE

(75) Inventors: Helmut Liepold, Gremsdorf (DE); Willfried Wienholt, München (DE); Clemens Schäffner, Martinsried (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/647,433

(22) PCT Filed: Nov. 3, 1998

(86) PCT No.: PCT/DE98/03204

§ 371 (c)(1), (2), (4) Date: Oct. 2, 2000

(87) PCT Pub. No.: WO99/50719

PCT Pub. Date: Oct. 7, 1999

(30) Foreign Application Priority Data

Mar. 31, 1998 (DE) .......................... 198 14 407

(51) Int. Cl.$^7$ ............................... G05B 13/02
(52) U.S. Cl. ................... 700/48; 700/47; 700/30; 700/31; 700/126; 706/23; 706/904
(58) Field of Search ............... 700/28, 29, 47, 700/48, 49, 108, 109, 122, 126, 139, 30, 31; 242/159, 160.1; 703/2, 7; 706/12, 14, 15, 16, 23, 903, 904

(56) References Cited

U.S. PATENT DOCUMENTS

| | | | | |
|---|---|---|---|---|
| 5,008,842 A | * | 4/1991 | Nagai et al. ................. | 702/183 |
| 5,308,010 A | * | 5/1994 | Hakiel ........................ | 242/534 |
| 5,402,353 A | * | 3/1995 | Laplante et al. ............ | 700/126 |
| 6,000,827 A | * | 12/1999 | Hosogi et al. ................ | 700/48 |
| 6,047,275 A | * | 4/2000 | Jaremko et al. .............. | 706/1 |
| 6,185,470 B1 | * | 2/2001 | Pado et al. ................... | 700/104 |
| 6,263,257 B1 | * | 7/2001 | Aemmer ...................... | 700/139 |
| 6,363,289 B1 | * | 3/2002 | Keeler et al. ................ | 700/48 |

FOREIGN PATENT DOCUMENTS

| | | | |
|---|---|---|---|
| DE | 195 31 692 A1 | 4/1996 | ........... G05B/13/02 |
| DE | 195 05 506 A1 | 8/1996 | ............ H02P/7/44 |
| DE | 195 08 474 A1 | 9/1996 | ........... G05B/13/00 |

OTHER PUBLICATIONS

Japanese Abstract, Publication No. 09110251 A, Date of Publication: Apr. 28, 1997.

Schaffrath et al., "Numerische Berechnung von Spannungsverläufen und Wickelhärte in einer Papierrolle", pp. 350–361.

* cited by examiner

Primary Examiner—John Follansbee
Assistant Examiner—Crystal J Barnes
(74) Attorney, Agent, or Firm—Baker Botts LLP

(57) ABSTRACT

A method for modeling a paper winding device, particularly for modeling a tambour drum cutter. Influencing and control quantities are determined at a real paper winding device and are stored dependent on time. Said quantities are used to determine the web strength depending on the wound number of layers or, respectively, or a correlative quantity is used as a target quantity along with the other relevant control and influencing quantities to enable a neural network to be trained as a model for a nip (Ni) for this winding device. New data for training the network can be continually obtained during the operation of the arrangement, thereby improving the model. Optimal control parameters can be determined for various production requirements by means of an iterative process dependent on the winding quality, which can also be determined from the web strength.

11 Claims, 2 Drawing Sheets

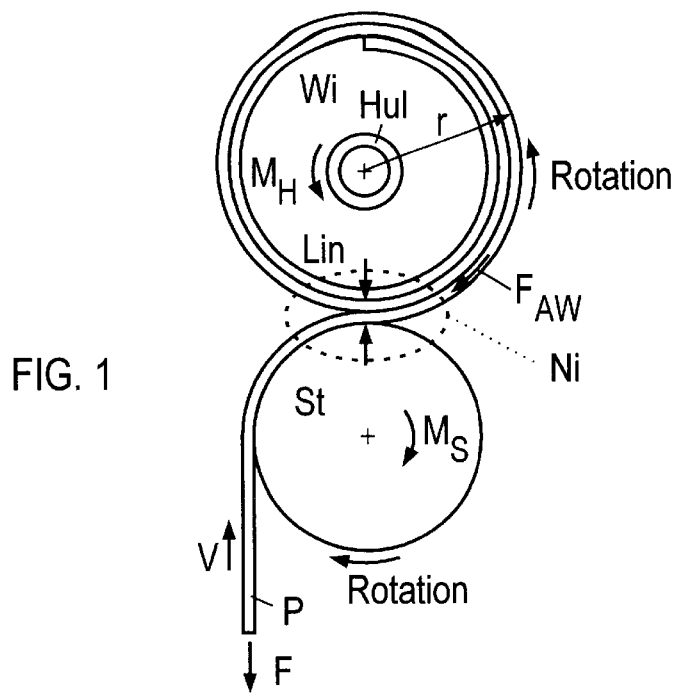
FIG. 1
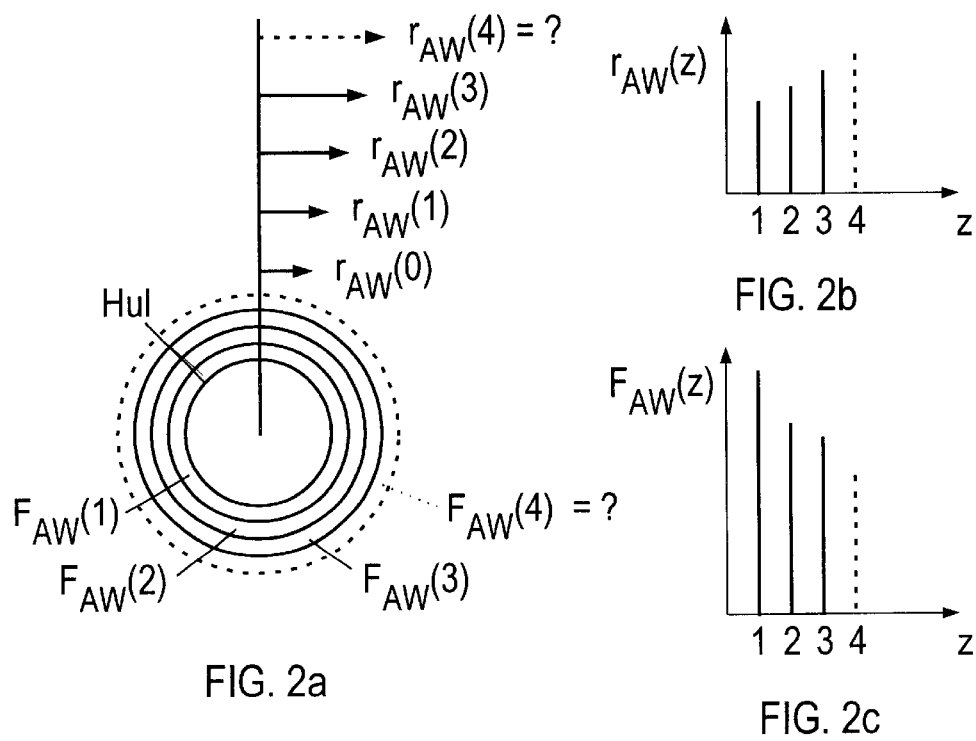
FIG. 2a
FIG. 2b
FIG. 2c

METHOD AND ARRANGEMENT FOR NEURAL MODELING OF A PAPER WINDING DEVICE

BACKGROUND OF THE INVENTION

1. Field of the Invention

The present invention relates to a method and arrangement for preparing a neural model of a paper winding device, such as a drum cutter.

2. Description of the Related Art

Given the production of paper, it has proven successful to store the paper in the form of drums, which are also referred to as tambour or coil, since very large paper quantities thereby can be stored crease-free in the smallest space for bearing, transporting and processing.

A paper winding device contained in the drum cutter has the task to unwind a broad coil of paper and to develop paper webs corresponding to the requests of the customers, whereby conventional paper widths can certainly amount to 9.5 m. For this purpose, these are cut in longitudinal direction and the narrower paper webs arising thereby are wound up again. Doubling roll coilers are frequently utilized due to their technical preferences for the winding-up (one is schematically shown in FIG. 1). This winding process critically influences the quality of the paper on the wound rolls, this quality being strongly dependent on the tensions in the paper occurring in the rolls. The tangential and radial tensions arising in the paper coil, among other things, are influenced by the following influencing and control quantities of the paper winding device and the paper:

- by their moments and speed given the center drive;
- by its moment and speed given the doubling roll drive;
- by the winding radius, the line force in the nip, adjustments of the friction dampers and the width of the coils given the winding stations;
- by geometrical influencing quantities, such as the doubling roll radius, the width of the tambour, and the radius of the sleeve onto which the paper coils are wound;
- by the properties of the paper, such as the modulus of elasticity, the G.M.S per density, the roughness, the smoothness, the moisture, the porosity, as well as by the elongation at rupture;
- by other influencing quantities, such as the web strength, the roughness of the doubling roll, the friction value of the doubling roll for each paper type, as well as by the modulus of elasticity of the sleeve onto which it is wound.

Since these influencing and controlling quantities are also dependent on environmental conditions, such as the humidity and the temperature, such winding processes are very difficult to describe analytically. For these reasons, it is particularly difficult to meet the quality requirements with respect to such coils and to constantly keep them. Expert knowledge is still utilized thereby with respect to the prior art, in particular Predominantly, it is to be assured that reproducible coils having an optimal coil hardness structure arise during the winding process. Furthermore, a lateral progressing, which is also referred to as telescoping of the roll, is to be prevented. The winding process is to be particularly rid off tears and broken picks, as well as plastic deformations.

The controlling quantities for such paper winding devices and particularly for drum cutters have been hitherto fixed, in the form of set value tragjectories in an initial operation phase by initial operation engineers, manually and on the basis of their expert knowledge. This requires great technological knowhow, skills and time. Generally, a separate set of set value trajectories of the paper winding devices is fixed for each paper type of the product spectrum and is stored in the, for example, process computer, which controls the drum cutter. In a later operation, the set value trajectories are read out of the memory and are utilized for controlling the winding device. A specific quality level is achieved as a result of this course of action; however, the quality that can be obtained thereby is limited by the following factors:

it cannot be assured that optimal control trajectories are always utilized, since there is no mathematical model for determining optimal control trajectories. On a case by case basis, sub-optimal control trajectories therefore can be applied.

drifts of measuring devices or as a result of a tear remain unconsidered.

variations of the paper parameters within one type, such as the G.S.M or the elasticity module, remain unconsidered.

When the winding quality worsens below an acceptable value as a result of the cited effects during the operation of a drum cutter or of another paper winding device, the driver of the device must manually intervene for correction purposes. General theoretical basics for the processes occurring during the paper winding are described in H.-J. Schaffrath, F. Hibinger and L. Goettsching "Numerische Berechnung von Spannungsverlaeufen und Wickelhaerte in einer Papierrolle", pages 350–361, No. 6, 1994. Methods for the automated preparation of control parameters for paper winding devices and particularly for drum cutters are not yet known.

SUMMARY OF THE INVENTION

The present invention is based on the object of providing a method and a device for the neural modeling of paper winding devices and particularly for the optimization of the control parameters of these devices.

This and other objects and advantages of the invention are provided by a method for the neural modeling of a paper winding device, wherein influencing and control quantities of a paper winding device are provided in a first step for the training of a neural network, in that these are measured and are stored at least depending on the wound number of layers and the appertaining coil radius of the paper coil, wherein the web strength in the paper web or a quantity correlated with it, depending on the influencing and control quantities of the paper winding device, is determined as target quantity for the neural network from the relationship between the measuring quantities coil radius and appertaining number of layers of the paper coil, and wherein the neural network is trained as model of the paper winding device via a conventional learning method at least with influencing and control quantities of the paper winding device as input quantities and the web strength dependent thereon or, respectively, the quantity correlated with the web strength as output quantities.

In the method, the influencing and control quantities are measured at a real paper winding device and/or at the paper, and/or the environment of the paper winding device or of the paper. The influencing and control quantities are measured dependent on time.

In one embodiment, the method for generating optimal control quantities for a paper winding device depending on a desired winding quality of the paper coil, wherein influencing quantities and control quantities of the paper winding device to be optimized are supplied in a first optimization step to the neural model prepared according to one of the claims 1 through 3 and wherein a first web strength or, respectively, a first quantity correlated with the first web strength is determined therefrom with the aid of the model, wherein a first winding quality is determined in a second step from the known relationship between the web strength or, respectively, the quantity correlated with the web strength and winding quality from the first web strength or, respectively, the correlated first quantity, and wherein the first winding quality is compared to the desired winding quality and wherein at least second control quantities of the paper winding device to be optimized are supplied in a further optimization step to the model, whereby this course of action is kept until the winding quality determined from the two steps above sufficiently accurately corresponds to the desired winding quality.

The change of the winding quality is determined depending on the change of the control quantities of two adjacent optimization steps and wherein it is concluded from this change in which way the control quantities are to be changed for the next optimization step in order to arrive at the desired winding quality. The control trajectories may be generated as a time-dependent sequence of control variables.

An operating method for a paper winding device is provided, wherein control quantities, which have been generated in an optimized manner according to the foregoing, are supplied to the paper winding device.

The objects of the invention are also achieved by an arrangement for the neural modeling of a paper winding device, which includes first means for measuring influencing and control quantities of the paper winding device depending on the wound number of layers and the appertaining coil radius of the paper coil, which includes second means for determining the web strength in the paper web as a target quantity or, respectively, a quantity correlated with the web strength for the neural network at least from the relationship from the quantities coil radius and appertaining number of layers of the paper coil measured by the first means, and depending on the influencing and control quantities of the paper winding device, whereby the quantities measured by the first means being supplied to said influencing and control quantities, which has a neural network as a model of the paper winding device, whereby the quantities, which are determined or, respectively, measured by the first and second means being supplied to said neural network, which learns via a conventional learning method the dependency of the quantities from one another, which are supplied to it.

Preferably, the arrangement at least includes means for storing one of the measured or determined quantities. The paper winding device may be fashioned as a tambour cutter.

A method provides at least driving moments of the winding device, as well as the elasticity module of the paper are measured.

A particular advantage of the inventive method is that the neural model is prepared with the aid of an intermediate quantity, the web strength or a measured quantity correlated therewith, whereby it can be determined from the relation between the coil radius and the number of layers. Since the measuring quantities are determined at the real system for this relationship and are available for different points in time, a neural network can be directly trained as a model of a nip by means of control parameters. The advantage is that merely the relationship between control quantities and web strength or a quantity correlated with it must be modeled by the neural network and that relationships that are known from the prior art can be used for determining the winding quality depending on the web strength. When the average layer thickness is used as a quantity correlated with the web strength, it can be determined by measuring the radius increase given counting of the number of layers at the same time. The cited prior art in the mentioned printed publication is referenced for detail information regarding this topic.

Advantageously, the proposed method can be applied in a two-step fashion. For example, while a neural network is coupled to a paper winding device and the influencing and control quantities are supplied to it, it can learn the relationship between the number of layers and the control parameters, as well as of the web strength or, respectively, the quantity correlated with it. A second neural network can be utilized as a current copy of the neural network connected to the machine for preparing optimized control parameters. Advantageously, an iterative method is carried out for determining the optimized control parameters, whereby the relation between the control and influencing quantities and the web strength or, respectively, the quantity correlated with it is modeled particularly by the neural network, which represents a model of the paper winding device and thereby particularly of the nip, and whereby the winding quality is calculated with the modeled web strength from the known relationship from the prior art. When a quantity correlated with the web strength is modeled, it is possible that it is directly measurable, as this is valid for the average layer thickness. This calculated winding quality can be subsequently compared to the desired winding quality to be obtained during the winding process, and the control parameters can be adapted to the operation, in a quasi off-line manner, solely by utilizing the model in that they are continuously modified until the desired winding quality appears with sufficient accuracy.

An optimal changing direction of the control parameters can be concluded from the difference of the winding quality between two adjacent optimization steps and changes of the control parameters, which are associated therewith and which relate to these optimization steps, so that control parameters, which are changed in the correct direction, can be prescribed in a further optimization step.

As a result of the proposed method, set value trajectories are advantageously provided for the control parameters, since the measured quantities change in the course of the winding process and adapted control quantities are required.

A paper winding device or a drum cutter can be particularly advantageously operated by means of the optimized control parameters or, respectively, set value trajectories as proposed, since the above-described disadvantages are thus avoided and a higher quality level can be obtained during the paper winding process.

The proposed method is particularly advantageously performed with the aid of an arrangement, wherein the neural network is directly coupled to the paper winding device and wherein the relevant measured quantities, such as the influencing quantities of the paper, can be directly supplied to it, since the neural network can thus be permanently retrained in the online mode during the winding process. A copy of the neural network can be simply made for an optimization of control parameters occurring on a case by case basis for further winding processes. Therefore, the most current and best trained version of the network is always available.

Particularly advantageously, a neural network can be arranged at the paper winding device of a drum cutter, since drum cutters are frequently utilized in order to carry out customer customizations of paper webs.

In the proposed method or, respectively, in the proposed arrangement, at least the driving moments of the winding device and the modulus of elasticity of the paper are particularly advantageously measured, since these influencing quantities are extremely important for the obtainable quality during the winding process.

BRIEF DESCRIPTION OF THE DRAWINGS

The invention is subsequently explained in greater detail on the basis of Figures.

FIG. 1 shows a schematic representation of a doubling roll coiler in an end view;

FIGS. 2a, 2b and 2c are force diagrams which illustrate the relationship between the number of layers, web strength and coil radius;

FIG. 5 is an end view of two rollers which illustrates the relationship between layer number and radius increase.

DETAILED DESCRIPTION OF THE PREFERRED EMBODIMENTS

Figure 3:
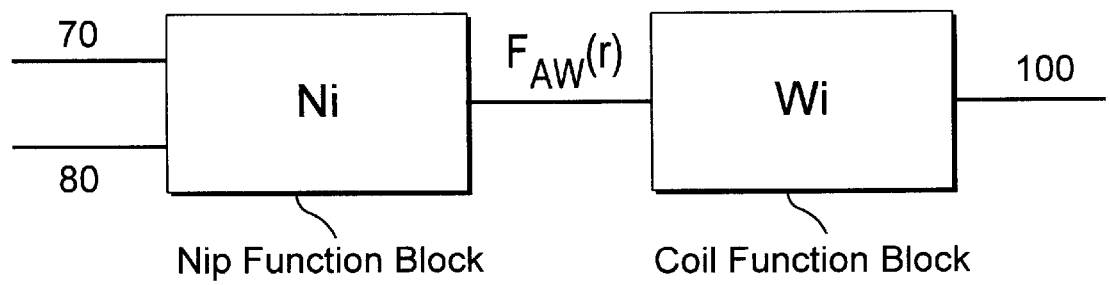
FIG. 3 is a block diagram of a paper winding device.

FIG. 1 schematically shows the structure of a doubling roll coiler having the radius r as a coil radius, F as the web strength in front of the doubling roll St and the web speed v. The paper web is referred to as P and the wound web strength or also the web strength on the coil is referred to as $F_{AW}$. The driving moment of the center drive of the coil sleeve is referred to as $M_H$ and the driving moment of the doubling roll is referred to as $M_S$, whereby the coil is referred to as Wi and the sleeve as Hul. A line force, which can be influenced by friction damper adjustments, occurs in the contact point of the two rolls, which is also referred to as Ni. A plurality of paper webs are already wound on top of one another on the coil Wi, whereby this is indicated by concentrical circles.

The conditions in the what is referred to as nip, in which the two paper sides are touched by the different rolls, play an important role for the criteria of the obtainable quality with respect to paper winding devices, which are particularly utilized for drum cutters of paper rolls as well. Particularly the behavior of the winding device is to be inventively modeled depending on the control parameters and the web strength $F_{AW}$ in the nip by means of a neural network. The web strength $F_{AW}$ as well as the quantities of take-up hardness and average layer thickness correlated with it depends on the control quantities and on further influencing quantities of the paper and the environment, for example. For example, control parameters are the driving moments $M_S$ of the doubling roll St and the center drive $M_H$, the line force Lin with which the angle Wi is pressed onto the doubling roll, the web tension in front of the nip F and, on a case by case basis, friction damper adjustments by means of which vertical movements of the angle Wi on the doubling roll St are damped by hydraulic dampers or by eddy current brakes. For example, influencing quantities are the properties of the paper, such as the elasticity module, the G.S.M. in relation to the density, the roughness, the smoothness, the moisture, the porosity and the elongation at rupture of the paper. For example, the roughness and friction value, as well as geometric data such as the paper web widths must be considered with respect to the. doubling roll properties.

The processes in the nip are very complex and are difficult to describe analytically. Therefore, there is no utilizable model in the prior art for the nip behavior of a doubling roll coiler. Consequently, a model of the nip is to be generated data-based by a neural network. According to the method, the input data of the neural network, namely the control quantities and the other already described influencing quantities and the output quantities, namely the web strength $F_{AW}$ or, respectively, the quantity correlated with it, for this purpose, are stored for a plurality of winding processes in order to be able to train the neural network therewith. Since the output quantity is not measurable, its determination is a problem. Therefore, it is initially proposed to calculate this non-measurable quantity $F_{AW}$, namely the web strength, from known measurable quantities. Analogously, the average layer thickness can be calculated from the radius increase and the number of layers.

According to FIG. 2, there is a relationship between the web strength $F_{AW}$, the coil radius $r_{AW}$ and the number of layers of the wound paper. According to the invention, the web strength $F_{AW}(r)$ therefore can be reconstructed depending on the coil radius r in that, for example, the coil radius $r_{AW}$ is measured depending on the number of paper layers z. FIG. 2 also shows that there is a relationship between the web strength and the radial deformation of the paper, which then has an effect on the coil radius dependent on the number of layers and the roll-up coil hardness, as well as on the average layer thickness. For example, three paper layers are already wound-up in FIG. 2. The web strengths $F_{AW}(1)$, $F_{AW}(2)$, $F_{AW}(3)$ are allocated to the respective paper layers. The following relationship is valid for the fourth momentarily wound layer and its web strength $F_{AW}(4)$. The higher the web strength $F_{AW}$ during the winding-up of the fourth layer, the higher the radial pressure exerted onto the paper webs lying therebelow and the smaller the resulting coil radius $r_{AW}$ of the coil with four layers due to the elastic deformation of the paper. The coil radiuses allocated to the corresponding coil layers, with numbers corresponding to the web strengths, are designated for the individual layers, whereby $r_{AW}(0)$ indicates the radius of the sleeve Hul onto which the paper is wound. The wound paper layers in FIG. 3 are assumed as concentric circles in order to make is simple. It is possible to determine the web strength via the tangential deformation of the paper (not shown here). Preferably, corresponding measuring devices must be provided therefor in axial direction in order to determine the layer-dependent deformation. The following functional relationship is valid for determining the web strength:

$r_{AW}(z)=f(F_{AW}(r))$

It drives for the web strength dependent on the radius $F_{AW}(r)=f^{-1}(r_{AW}(Z))$.

Subsequent to the reconstruction of the web strength on the coil dependent on the measurable data, the parameters are available for the training of the neural network for simulating the nip. The web strength thereby preferably forms the target quantity of the neural network, while the influencing and controlling quantities form the defaults for the set value trajectories, which are to be learned. Since these quantities have been measured at a real paper winding device, the network can be trained with respect to a nip model with the aid of this course of action on the basis of a normal known learning method, whereby the neural network works as a static function approximator.

As shown in FIG. 3, the proposed method is preferably composed of two function blocks, whereby one function block Ni models the nip and the second function block Wi the coil. For example, the aforementioned influencing and controlling quantities 70 and 80 are supplied to the first function block, whereupon it consequently outputs a web strength $F_{AW}$ depending on the radius r. This web strength is supplied to the model for the coil Wi on which a winding quality 100 is established depending on a web strength. It must be particularly considered that the web strength is not reconstructed as measuring quantity via the winding quality but via the dependency between the number of layers and the establishing coil radius or, respectively, the average layer thickness and the roll-up coil hardness. For purposes of determining optimal control parameters for the paper winding device, the winding quality is directly calculated from $F_{AW}$ by means of relationships known from the prior art. According to the method, a better winding quality can be achieved when a mathematical model is present for the entire coil process. It is thereby possible to undertake an optimization regarding the winding quality in order to receive optimal control trajectories for the coil process. This means that optimal control trajectories can be prepared for the entire process via the winding quality 100 and the control trajectories 70 and 80 with the aid of the intermediate quantity web strength $F_{AW}(r)$ or with the aid of a quantity correlated with it and the two models Ni and Wi for the nip and the coil. Depending on r or a quantity correlated with the web strength, the web strength $F_{AW}$ acts as link between the two sub-models. The intermediate step via the web strength $F_{AW}$ is taken, since the winding quality cannot be directly measured but conditions a destruction of the paper coil. It is certainly conceivable that future measuring devices will allow a direct measuring of the winding quality, whereby, as proposed, the neural network can then be trained directly with the winding quality as target quantity and the control trajectories as input quantities in order to thus receive a complete model of the paper winding device.

Figure 4:
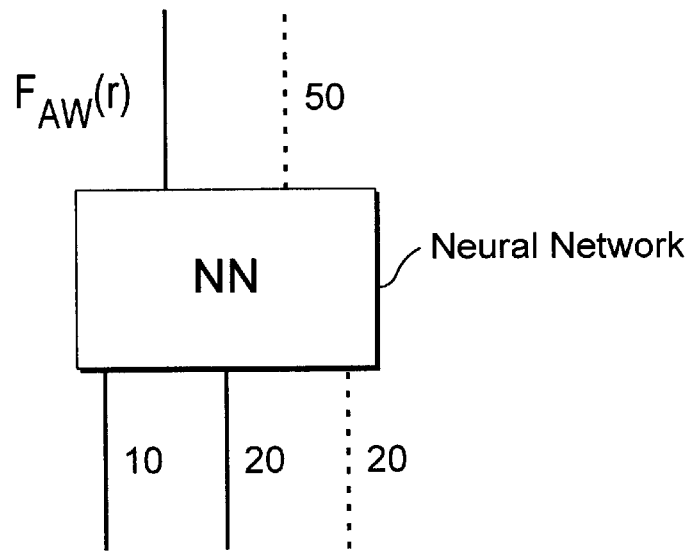
FIG. 4 shows a neural network with input and output quantities.

FIG. 4 shows a neural network NN, which preferably inventively shows a model for the nip of a paper winding device. Quantities 10 through 30 are supplied to the neural network NN, whereby it generates output quantities $F_{AW}(r)$ and 50 therefrom. As it has already been described, quantities that are measured at the real paper winding device are preferably supplied to the neural network during the training. The web strength $F_{AW}$ is reconstructed as target quantity preferably via the relationship between the number of layers and the coil radius and is utilized during the training of the network. According to the method, a neural network can be permanently co-arranged at a paper winding device, whereby the corresponding quantities necessary for the learning process of the neural network are supplied to it during the operation of this device. This has the advantage that the neural network is constantly trained with the current behavior of the paper winding device and therefore can imitate the behavior of the machine better and better. On a case by case basis, measuring values that are picked up by measuring sensors, which detect specific measuring quantities of the paper arrangement, can be supplied to the neural network as quantities 10 through 30. On a case by case basis, static property quantities such as geometric data, paper properties and environmental conditions can also be supplied during the training of the network. The supply can be carried out by means of measuring sensors or by other input means. If it is potentially possible at one point to determine the winding quality of the paper directly at the coil without destroying it, the invention can certainly also be fashioned with the winding quality as target quantity. Preferably, optimal control trajectories are determined by the neural network via the already described course of action with an iterative method by prescribing control parameters and calculating the winding quality via $F_{AW}$ and the known relationship from the prior art between $F_{AW}$ and the winding quality in that new parameters are constantly prescribed until a desired winding quality and a winding quality that is to be obtained in the process is achieved. Analogously, this course of action is valid for quantities correlated with the web strength, which quantities can be indirectly derived, such as the average layer thickness. These control trajectories determined at the neural network are then prescribed as control trajectories for the paper winding process with respect to the real arrangement. It is particularly advantageous about the invention that the so determined and optimized control parameters are always adapted to the current process behavior and the influencing quantities of the process, so that the highest possible quality can be obtained by the proposed course of action. Furthermore, the proposed course of action enables an optimal accuracy during the adjustment, since it is not based on knowledge from experience but on measuring quantities and mathematical relationships or, respectively, neural models.

As shown in FIG. 5, a quantity correlated with the web tension, instead of the web tension, can also be modeled by the neural network; however, such a quantity, which can be modeled more general in this context, must fulfil the condition of being correlated with the web tension ($F_{AW}$) in order to be suitable for the coupling between the nip Ni and the coil Wi. Analogously to the representation in FIG. 3, the quantity that is correspondingly correlated with the web tension, which is modeled by the neural network, then occurs instead of the web tension $F_{AW}(r)$. The what is referred to as roll-up coil hardness is represented here as an example for a quantity that is correlated with the web tension $F_{AW}$. Different definitions exist for the roll-up coil hardness; the average paper layer thickness is to be used in the following: the number of wound layers z and the radius increase is determined by forming a difference $r_2-r_1$ during the roll-up process, as this is also shown in FIG. 5, where the coil is shown in the condition 100 having the radius r, before the winding-up of z-layers. Subsequent to this winding-up, the coil is in the condition 200 and has the radius $r_2$. The average layer thickness MLD can be determined via this change of the outer radius subsequent to the winding-up of z-layers. The mean is typically taken over Z=100 layers, for example, and the average layer thickness MLD is received, which represents a measure for the hardness of the winding:

$$MLD=MLD(r)$$

This equation is repeatedly evaluated during the winding-up process, so that a curve of the average layer thickness MLD is received dependent on the thickness radius r:

$$MLD=MLD(r).$$

In this case, the average layer thickness acts exactly reversed proportional relative to the web tension $F_{AW}$(see FIG. 2). The average layer thickness MLD determined in this way has the important advantage that it can be calculated online during the operation of a drum cutter. For this purpose, merely the radius must be measured and the paper layers on the coil must be counted. The calculation according to the equation is merely falsified by the elastic deformation of the paper layers, which are situated between the sleeve and the outer radius r, prior to the winding-up of the z-layers. This deformation is effected by the radial pressure, which is exerted by the z-layers wound under tangential tension onto the paper layers lying therebelow. However, the falsification can be corrected in the framework of the further processing, the values received by means of the averaging equation.

After the web tension $F_{AW}$ and the roll-up coil hardness or, respectively, of the average layer thickness MLD have been correlated, the following relationship is valid: when the web force $F_{AW}$ is increased, the paper is lapped with a greater tangential tension. This leads to increased radial pressures and to an increased layer pressing. A smaller average layer thickness MLD results therefrom, i.e., the coil is wound harder. $F_{AW}$ and MLD therefore are highly correlated. According to the representations in FIG. 3, the nip can be subsequently modeled by the neural network with the aid of MLD (r) instead of $F_{AW}(r)$. The utilization of the average layer thickness thereby has the advantage that these, as explained above, can be measured with the aid of the averaging equation and the correlation between the web strength and the average layer thickness.

Although other modifications and changes may be suggested by those skilled in the art, it is the intention of the inventors to embody within the patent warranted hereon all changes and modifications as reasonably and properly come within the scope of their contribution to the art.

We claim:

1. A method for neural modeling of a paper winding device, further comprising the steps of:
   a) measuring and storing influencing and control quantities of a paper winding device in a first step for training of a neural network at least depending on a wound number of layers and an appertaining coil radius of a paper coil,
   b) determining one of web strength in a paper web and a quantity correlated with the web strength depending on the influencing and control quantities of the paper winding device as target quantity for the neural network from a relationship between the coil radius and the number of layers of the paper coil measured in said measuring and storing step, and
   c) training the neural network as a model of the paper winding device via a conventional learning method at least with the influencing and control quantities of the paper winding device as input quantities and one of the web strength and the quantity correlated with the web strength as output quantities.

2. A method according to claim 1, further comprising the step of:
   measuring influencing and control quantities at a real paper winding device and paper.

3. A method according to claim 1, further comprising the step of: measuring the influencing and control quantities dependent on time.

4. A method according to claim 1, further comprising the step of:
   measuring driving moments of the winding device and modulus of elasticity of the paper.

5. A method for generating optimal control quantities for a paper winding device depending on a desired winding quality of the paper coil, further comprising the step of:
   a) supplying influencing quantities and control quantities of the paper winding device to be optimized in a first optimization step to the neural model prepared according to the following steps of:
      measuring and storing influencing and control quantities of a paper winding device in a first step for training of a neural network at least depending on a wound number of layers and an appertaining coil radius of a paper coil,
      determining one of web strength in a paper web and a quantity correlated with the web strength depending on the influencing and control quantities of the paper winding device as target quantity for the neural network from a relationship between the coil radius and the number of layers of the paper coil measured in said measuring and storing step, and
      training the neural network as a model of the paper winding device via a conventional learning method at least with the influencing and control quantities of the paper winding device as input quantities and one of the web strength and the quantity correlated with the web strength as output quantities, and
   determining one of a first web strength and a first quantity correlated with the first web strength from the neural network with the aid of the model
   b) determining a first winding quality in a second step from the known relationship between the one of the web strength and the quantity correlated with the web strength and a winding quality from the first web strength or the correlated first quantity, and
   c) comparing the first winding quality to the desired winding quality and supplying at least second control quantities of the paper winding device to be optimized in a further optimization step to the model, continuing until the winding quality determined from a) and b) sufficiently accurately corresponds to the desired winding quality.

6. A method according to claim 5, further comprising the step of:
   generating control trajectories as a time-dependent sequence of control variables.

7. A method according to claim 5, further comprising the step of:
   determining a change of the winding quality depending on a change of the control quantities of two adjacent optimization steps and
   concluding from said change in the winding quality in which way the control quantities are to be changed for a next optimization step in order to arrive at the desired winding quality.

8. An arrangement for neural modeling of a paper winding device, comprising:
   a) first means for measuring influencing and control quantities of the paper winding device depending on a wound number of layers and an appertaining coil radius of a paper coil,
   b) second means for determining a web strength in a paper web as one of a target quantity and a quantity correlated with the web strength for the neural network at least from a relationship of the coil radius and the wound number of layers of the paper coil measured by the first means, and depending on influencing and control quantities of the paper winding device, the quantities measured by the first means being supplied to said influencing and control quantities, and
   c) a neural network as a model of the paper winding device, said neural network being connected to receive the quantities, which are determined by the first and second means so that said neural network learns via a conventional learning method a dependency of quantities from one another.

9. An arrangement according to claim 8, further comprising:

means for storing one of the measured quantities.

10. An arrangement according to claim 8, wherein the paper winding device is a tambour cutter.

11. An operating method for a paper winding device, comprising the step of:

supplying influencing quantities and control quantities of the paper winding device to be optimized in a first optimization step to the neural model prepared according to the following steps of:

measuring and storing influencing and control quantities of a paper winding device in a first step for training of a neural network at least depending on a wound number of layers and an appertaining coil radius of a paper coil, determining one of web strength in a paper web and a quantity correlated with the web strength depending on the influencing and control quantities of the paper winding device as target quantity for the neural network from a relationship between the coil radius and the number of layers of the paper coil measured in said measuring and storing step, and training the neural network as a model of the paper winding device via a conventional learning method at least with the influencing and control quantities of the paper winding device as input quantities and one of the web strength and the quantity correlated with the web strength as output quantities, and determining one of a first web strength and a first quantity correlated with the first web strength from the neural network with the aid of the model, determining a first winding quality in a second step from the known relationship between the one of the web strength and the quantity correlated with the web strength and a winding quality from the first web strength or the correlated first quantity, and comparing the first winding quality to the desired winding quality and supplying at least second control quantities of the paper winding device to be optimized in a further optimization step to the model, continuing until the winding quality determined from said determining steps sufficiently accurately corresponds and the desired winding quality, supplying control quantities to the paper winding device.

* * * * *